United States Patent [19]

Curtindale

[11] Patent Number: 5,752,853
[45] Date of Patent: May 19, 1998

[54] SNAP-IN VISOR MOUNT AND ELECTRICAL CONNECTORS FOR VISOR MOUNTS

[75] Inventor: Edward G. Curtindale, Farmington Hills, Mich.

[73] Assignee: United Technologies Automotive Systems, Inc., Detroit, Mich.

[21] Appl. No.: 571,586

[22] Filed: Dec. 13, 1995

[51] Int. Cl.$^6$ .................................................. H01R 13/60
[52] U.S. Cl. .................. 439/567; 248/300; 248/222.12; 439/660
[58] Field of Search .................. 439/567, 27, 537, 439/557, 626, 660; 362/529, 537, 527, 557, 34; 248/27.3, 222.11, 222.12, 300; 296/97.9

[56] References Cited

U.S. PATENT DOCUMENTS

| | | | |
|---|---|---|---|
| 2,825,799 | 3/1958 | Julien | 439/660 |
| 2,874,254 | 2/1959 | Daily et al. | 248/27.3 |
| 3,318,561 | 5/1967 | Finke et al. | 248/300 |
| 3,651,447 | 3/1972 | Branco et al. | 439/660 |
| 4,075,468 | 2/1978 | Marcus | 362/144 |
| 4,174,864 | 11/1979 | Viertel et al. | 296/97 H |
| 4,272,118 | 6/1981 | Viertel et al. | 296/97 R |
| 4,363,511 | 12/1982 | Viertel et al. | 296/97 K |
| 4,529,157 | 7/1985 | Suman et al. | 248/289.1 |
| 4,569,552 | 2/1986 | Marks | 296/97 K |
| 4,729,590 | 3/1988 | Adams | 296/97 K |
| 4,760,503 | 7/1988 | VandenBerge et al. | 362/137 |
| 4,913,484 | 4/1990 | Dowd et al. | 296/97.12 |
| 4,952,157 | 8/1990 | Hudson et al. | 439/537 |
| 4,989,911 | 2/1991 | VanOrder | 296/97.9 |
| 5,031,953 | 7/1991 | Miller | 296/97.9 |
| 5,031,954 | 7/1991 | Peterson et al. | 296/97.9 |
| 5,056,853 | 10/1991 | VanOrder | 296/97.9 |
| 5,061,005 | 10/1991 | VanOrder et al. | 296/97.9 |
| 5,082,322 | 1/1992 | Cekander et al. | 296/97.9 |
| 5,082,323 | 1/1992 | Dowd et al. | 296/214 |
| 5,143,678 | 9/1992 | Prillard | 264/255 |
| 5,201,564 | 4/1993 | Price | 296/97.9 |

Primary Examiner—J. J. Swann
Attorney, Agent, or Firm—Emch, Schaffer, Schaub & Porcello Co., L.P.A.

[57] ABSTRACT

This invention provides a metal mounting member for mounting a vehicle accessory such as a sunshade to the sheet metal structure of a vehicle such as the vehicle roof with minimal insertion force. The mounting member does not require use of tools or other fasteners. The mounting member is made from one piece of spring steel. This invention also includes a fast and efficient electrical contact that does not require a separate step of making an electrical contact during installation.

12 Claims, 6 Drawing Sheets

SNAP-IN VISOR MOUNT AND ELECTRICAL CONNECTORS FOR VISOR MOUNTS

TECHNICAL FIELD

This invention relates to a mounting assembly for attaching a visor pivot rod to a roof of a vehicle. The invention also relates to an electrical assembly for visor mounts.

BACKGROUND OF THE INVENTION

A variety of manners exist for attaching visors to the roof or headliner of a vehicle. Any system which is even somewhat difficult to use is not acceptable. Quickness of the installation also is critical. The industry prefers snap-in construction because of its ease and low costs benefits. The industry also prefers spring steel snap-in fastening systems over plastic snap-ins, because heat often distorts the plastic. Spring steel, however, often requires excessive force for mounting.

In a similar fashion, an electrical visor pivot rod connection provides electrical current to the visor or sunscreen. The hollow pivot rod terminates in a generally cylindrical insulative spacer which houses a wire terminating in an electrical contact. The electrical contact, in turn, makes electrical contact with an electrical contact housed in the opening of the vehicle roof. Even the best of these fittings may expose wires, which installation can easily clip or nick. The installation also requires an extra step of making the electrical connection.

DISCLOSURE OF INVENTION

My invention provides a metal mounting member for mounting a vehicle accessory such as a sunshade to the sheet metal structure of a vehicle such as the vehicle roof with minimal insertion force. My mounting member does not require use of tools or other fasteners. In an alternative embodiment, it can be a part of a headliner system. My mounting member is made from one piece of spring steel by using conventional metal-forming processes such as blank forming. Simple bending or folding forms the mounting member and a small spot weld or formed fastener hold the these dimensional member in place. The snap-in visor metal mounting member attaches to an aperture in the vehicle roof and is above the upper surface of the headliner. Screws threaded through a visor mounting bracket on the finish surface of a headliner system fasten the visor mounting bracket to the mounting member. Inserting the mounting member into the body to its final position causes the legs of the mounting member to be released from the tabs of the mounting member, thereby affixing the mounting member to the aperture and the vehicle. Locator tabs affixed to the mounting member fit into notched apertures in the vehicle roof and thereby prevent rotation. The tabs which temporarily position the legs prior to affixing are the key to low forces needed to insert the mounting member.

More specifically, my invention is a mounting member for the snap-in mounting of a vehicle visor within an aperture formed in the roof of a vehicle comprising:

a one piece mounting member made of spring steel including;

a horizontal base made from a plurality of base segments, the base having an upper and lower surface and the base segments forming a central aperture through the base, a plurality of V-shaped legs extending upwardly, outwardly and downwardly from the upper surface of the base and away from the central aperture of the base, the legs having lips which terminate near the upper surface of the base, the legs also forming the central aperture through the base, a plurality of tabs extending upwardly from the upper surface of the base and inwardly towards the central aperture of the base, the tabs having tips that terminate near the tips of the legs, and a plurality of locator tabs that extend vertically, upwardly away from the upper surface of the base.

In another aspect of this invention, I mount electrical connectors in the visor mounting bracket. I also provide a plate with two electrical connectors affixed to the upper surface of the headliner. This provides for fast and efficient electrical contact. The connectors provide a current path to the sun visor, yet limit the possibility of a electrical wire being cut or nicked during installation. Again, tightening the screws brings the electrical contacts together, thereby eliminating any need to make a separate step of making an electrical connection during installation. This system also eliminates any dangling wires.

More specifically, this mounting assembly for mounting a vehicle accessory to a sheet metal structure of a vehicle comprises a mounting member, a visor having a mounting bracket for fastening the visor to the mounting member, wherein the mounting bracket has an upper surface with electrical connectors insulatedly fastened to upper surface, a plastic insert having a lower surface with electrical connectors insulatedly fastened to the lower surface, wherein the plastic insert is located between the mounting member and mounting bracket. The plastic insert forms clearance hole and the mounting bracket forms clearance holes and the mounting bracket includes threaded fasteners that pass through the clearance holes of the mounting bracket, plastic insert and mounting member and engage the threaded holes of the mounting member. Tightening the threaded fastener engages the electrical contacts of the mounting bracket with the electrical contacts of the plastic insert.

While the preferred embodiment of this invention is a marriage of the mounting member and electrical connector assembly, either aspect can be used independently of the other.

BEST MODE OF CARRYING OUT INVENTION

Figure 1:
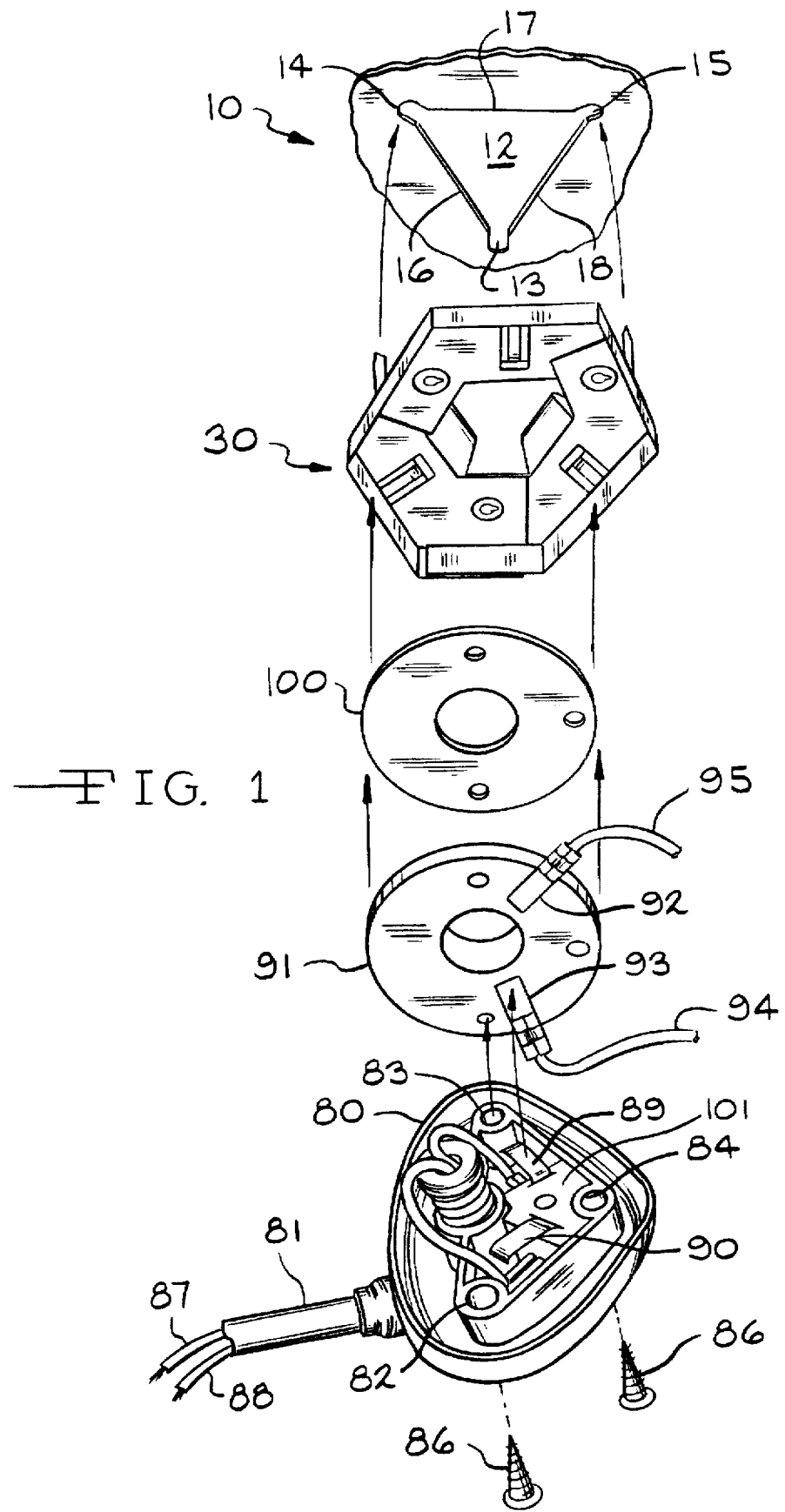
FIG. 1 is a fragmentary exploded prospective view of the present invention showing a visor, a visor mounting bracket, plate, mounting bracket and vehicle roof.

FIG. 1 shows a section of vehicle roof 10 having an aperture 12 formed therein. Aperture 12 is configured to lockably receive mounting member 30 of the present invention. A visor assembly (not shown) includes a visor (not shown), visor mounting bracket 80 and visor pivot rod 81. Plastic insert or plate 91 is located below vehicle roof 10, above a headliner system not shown. Screws 86 attach visor mounting bracket 80 to mounting member 30 with plastic insert 91 sandwiched there between. Anti slip member 100 can be included if desired.

Figure 2:
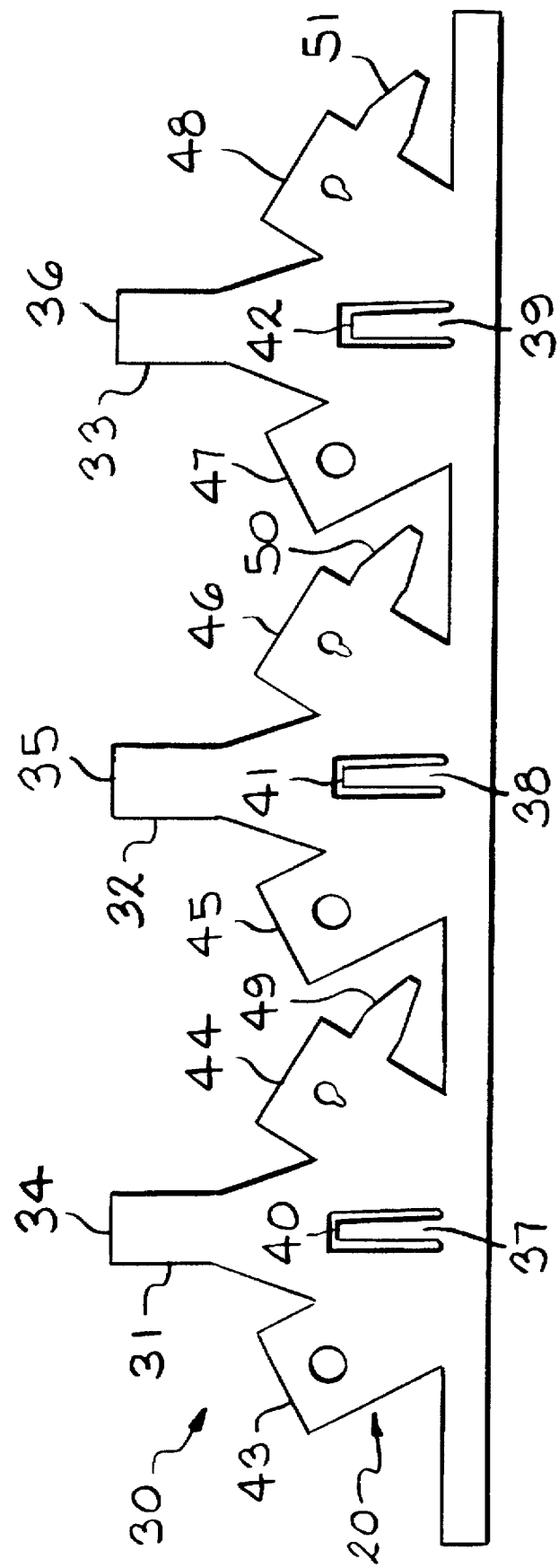
FIGS. 2–5 are blank views of FIG. 1A with broken lines indicating where bends or folds take place.

FIG. 2 shows one piece mounting member 30 in its two-dimensional, flat blank formed shape. Mounting member 30 is made from a spring steel such as 1075 spring steel having a thickness of approximately 0.75 mm. Mounting member 30 includes legs 31, 32 and 33 with leg tips 34-36 respectively. Mounting member 30 also includes leg tabs 37, 38 and 39, each having tips 40, 41 and 42 respectively. Mounting member 30 also includes base 20. Base 20 comprises base segments 43, 44, 45, 46, 47 and 48. Mounting member 30 also includes locator tabs 49, 50 and 51.

Figure 3:
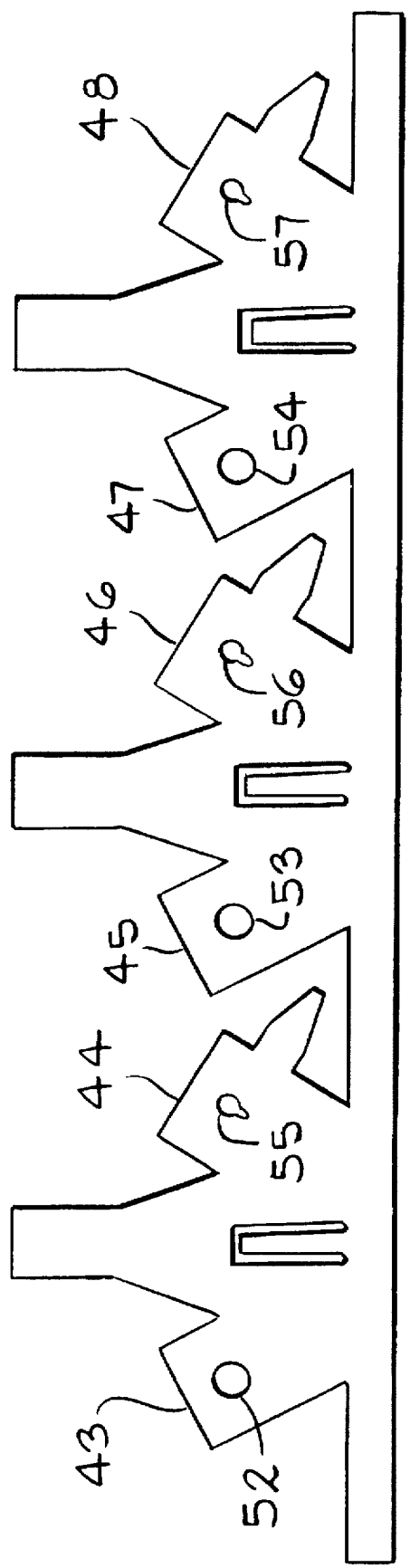

FIG. 3 shows mounting member 30 in greater detail. Base segments 43, 45 and 47 form clearance holes 52, 53 and 54 respectively. Base segments 44, 46 and 48 form threaded holes 55, 56 and 57 respectively. Screws 86 from visor mounting bracket 80 pass through holes 52, 53 and 54 and tighten into holes 55, 56 and 57. The diameter of the clearance holes is larger than the diameter of the screws. For example, if the screws have a diameter of 4 mm, the clearance holes will have a diameter of 6 mm.

Figure 4:
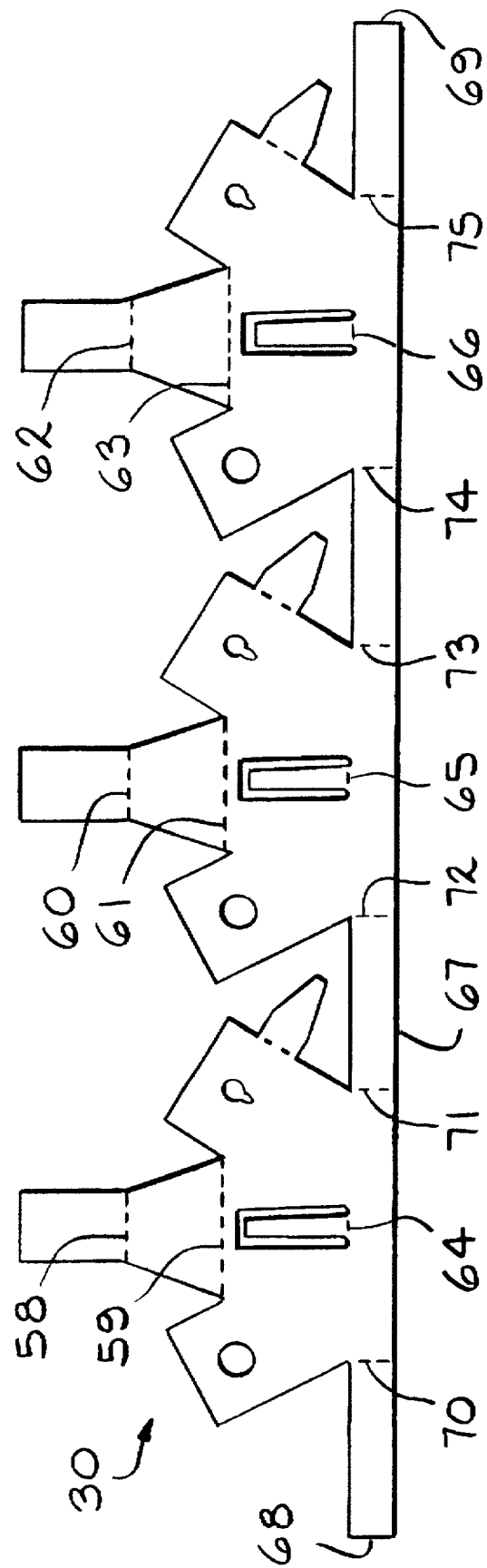

FIG. 4 shows mounting member 30 in greater detail and includes bend or fold lines 58-63. FIG. 4 also shows bend or fold lines 64, 65 and 66. Mounting member 30 also includes flange 67. Flange 67 includes flange ends 68 and 69 and bends 70-75.

Figure 5:
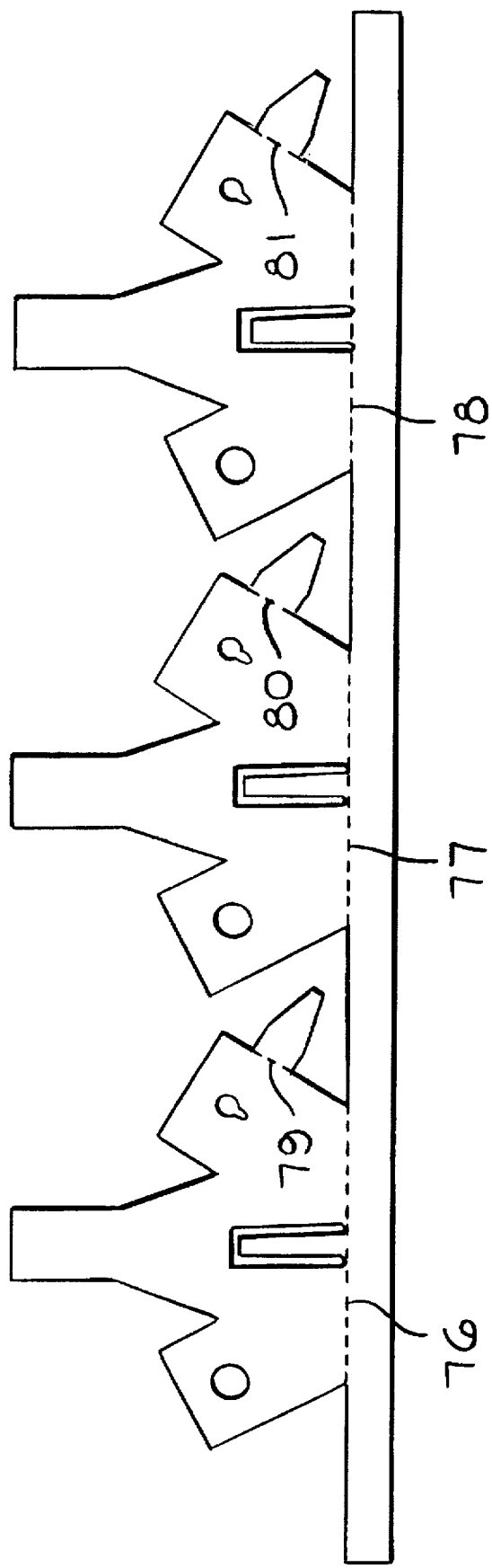

FIG. 5 shows bend or fold lines 76-81.

Figure 1A:
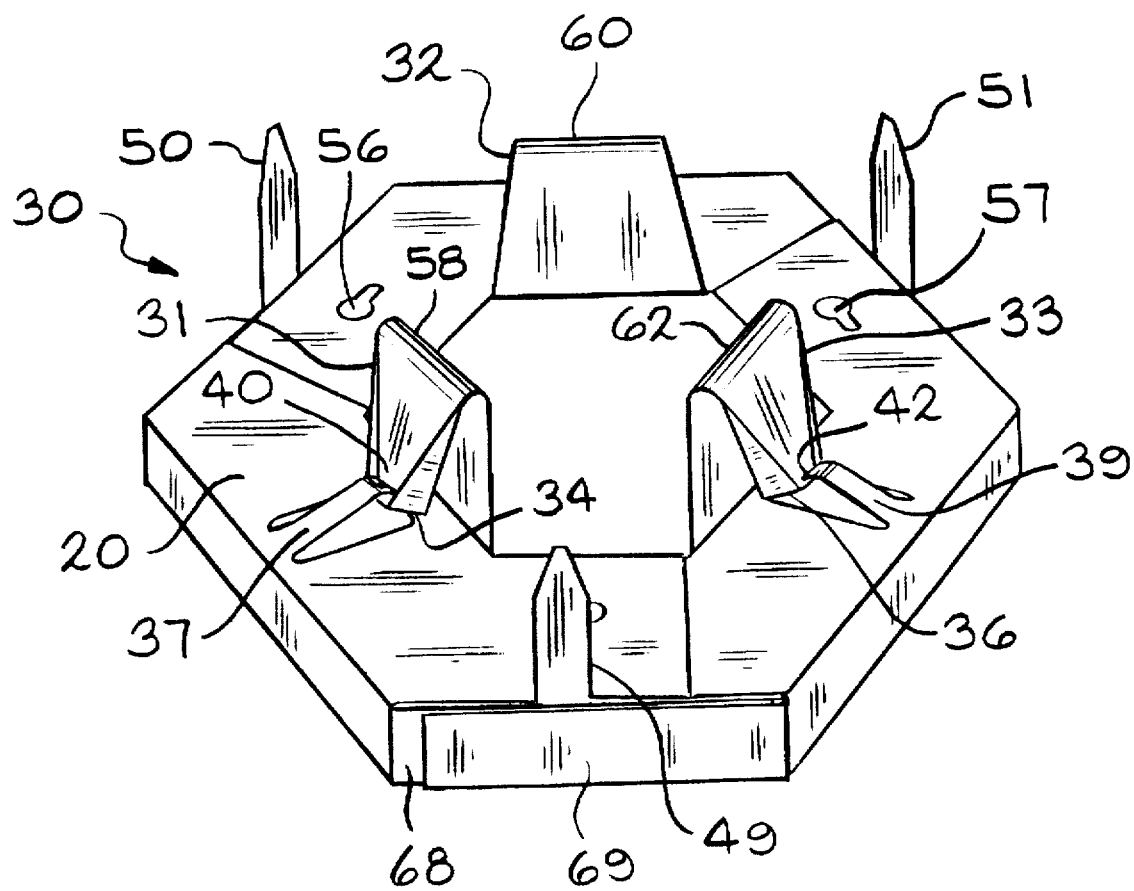
FIG. 1A is a top plan view of the one piece mounting member.

FIG. 1A shows mounting member 30 in its final formed shape. To achieve mounting member 30 in FIG. 1A, I performed the following operation on flat member 30 shown in FIGS. 2-5. Legs 31, 32 and 33 are formed by making bends at bend lines 58-63 respectively. In the preferred embodiment of the invention, legs 31, 32 and 33 are terminated in an inclined V-shape end for providing multiple engagement points for the legs. When in place, legs 31, 32 and 33 are adjacent edges 16, 17 and 18 of aperture 12 in vehicle roof 10. The crown of the V along the fold lines 58, 60 and 62 extend vertically upward into aperture 12 of vehicle roof 10. The bend along lines 59, 61 and 63 preferably is in a 90° angle to base 20. Tips 34, 35 and 36 extend downwardly towards base 20, yet do not engage base 20. The angle of the V can vary widely, but typically ranges from 30° to 45° from vertical.

Further bends or folds are made along lines 76, 77 and 78. Bends 76-78 along with bend lines 70-75 form base 20 preferably at right angles to flange 67. Flange ends 68 and 69 overlap where they may be fastened or joined such as by welding to form the finish part of FIG. 6. Base 20 is approximately at 90° angles to flange 67. Base segments 44, 46 and 48 overlap base segments 43, 45 and 47 respectively. Base segments 44, 46 and 48 preferably are above base segments 43, 45 and 47. The fold lines 70-75 bring mounted member 30 into a hexagon shape. Apertures 54, 56 and 57 are threaded to receive screws. Apertures 52, 53 and 54 are larger in diameter and the screws to pass therethrough so that they can engage the threads of the threaded apertures. Locator tabs 49-51 are folded or bent along bend lines 79, 80 and 81 so that they extend vertically upwards away from base 42. Tabs 49-51 engage notches 13, 14, 15 in aperture 12 when mounting member 30 in position in aperture 12.

A key feature of this invention is tabs 37, 38 and 39. Prior to installation in a temporary position tab tips 40-42 engage leg tips 34-36. To do this, tabs 37-39 must be bent slightly vertically upward away from base 20 along fold or bend lines 64-66. The tab tips will form an angle with the horizontal greater than 0° and up to or equalling 20°. After insertion of mounting member 30 into aperture 12 of the vehicle roof 10, tab tips 40-42 will be forced vertically downwardly away from vehicle roof 10 and will no longer engage leg tips 34-36. Edges 16, 17 and 18 respectively break the connection between leg tips 34-36 and tab tips 40-42 respectively. As a result, legs 31, 32 and 33 engage edges 16, 17 and 18 and mounting member 30 is locked in place. Simultaneously, locator tabs 49-51 engage notches 13, 14 and 15 and prevent mounting member 30 from rotating. The two means work together to hold mounting member 30 in vehicle roof 10.

Turning now to the aspect of the invention which includes an electrical connection. FIG. 1 also shows an electrified visor mounting bracket 80. Hollow pivot rod 81 engages visor mounting bracket 80. Typically, this is done with an intregally molded torque fitting visor mounting bracket 80 includes apertures 82-84 respectively for receiving sheet metal screws 86. Sheet metal screws 86 extend upwardly through the three apertures to engage apertures 55-57 of mounting member 30 respectively. Electrical wires 87 and 88 extend through hollow pivot rod 81 into a central aperture in visor mounting bracket 80. Electrical connectors 89 and 90 fasten to visor mounting bracket 80 adjacent the central aperture. Electrical wires 87 and 88 connect to connectors 89 and 90 respectively. Electrical connectors 89 and 90 are mounted to visor mounting bracket 80 on insulating pad 101. As a result of electrical connectors 89 and 90 being mounted on the upper surface of the visor mounting bracket 80, no wires are left dangling or no wires remain for electrical contact to wires above the headliner or in the vehicle roof.

FIG. 1 also shows plastic insert or plate 91 located below vehicle roof 10 and below mounting member 30. Electrical wires are adjacent insert 91 and are fastened to electrical connectors 92 and 93 on the lower surface of insert 91. As a result, when sheet metal screws 86 are tightened, electrical connectors 89 and 90 engage electrical connectors 92 and 93 respectively. As a result of this, no extra steps need be taken to make the electrical connection. Electrical wires 94 and 95 connect to connectors 92 and 93 respectively. Further, no dangling wires are exposed which can be damaged during assembly.

FIG. 1 also shows roof 10 forming aperture 12 in greater detail. Aperture 12 includes notches 13-15 and edges 16-18 for engaging mounting member 30.

I claim:

1. A mounting member for the snap-in mounting of a vehicle visor within an aperture in the roof of a vehicle comprising:

a one piece mounting member made of spring steel including;

a horizontal base having a central aperture therethrough, the base being made from a plurality of base segments, the base having an upper and lower surface and the base segments defining the central aperture through the base, a plurality of V-shaped legs extending upwardly, outwardly and downwardly from upper surface of the base, the legs extending upwardly away from the base, the legs having tips which extend outwardly away from the central aperture, downwardly towards the base and which terminate near the upper surface of the base, the legs also defining the central aperture through the base, a plurality of tabs extending upwardly from the upper surface of the base and inwardly towards the central aperture of the base, the tabs having tips that terminate near the tips of the legs, and a plurality of locator tabs that extend vertically, upwardly away from the upper surface of the base.

2. A mounting member according to claim 1 wherein the tips of the tabs touch the tips of the legs prior to insertion of the mounting member into an aperture in the roof of a vehicle.

3. A mounting assembly for mounting a vehicle accessory to a sheet metal structure of a vehicle comprising the mounting member of claim 1 and a roof of a vehicle an aperture wherein the aperture of the roof has edges that engage the legs of the mounting member and notches that engage the locator tabs of the mounting member.

4. A mounting assembly according to claim 3 wherein after insertion of the mounting member into an aperture formed in the roof of a vehicle, the tips of the tabs do not touch the tips of the legs.

5. A mounting assembly according to claim 4 wherein tips of the tabs are below the aperture in the roof and the tips of the legs are above the aperture in the roof.

6. A mounting member according to claim 1 wherein the base of the mounting member comprises a plurality of pairs of the base segments wherein in each pair of base segments one base segment overlaps the other base segment.

7. A mounting member according to claim 6 wherein in each pair of base segments, one base segment has a clearance hole and the other base segment has a threaded hole for receiving a threaded fastener.

8. A mounting assembly for mounting a vehicle accessory to a sheet metal structure of a vehicle comprising the mounting member of claim 1 and a vehicle accessory having a mounting bracket for fastening the accessory to the sheet metal structure.

9. A mounting assembly according to claim 8 wherein the mounting bracket has an upper surface with electrical connectors insulatedly fastened to the upper surface through an insulting pad.

10. A mounting assembly according to claim 9, including a plastic insert having a lower surface with electrical connectors insulatedly fastened to the lower surface, wherein the plastic insert is located below the lower surface of the mounting member and the upper surface of the mounting bracket.

11. A mounting assembly according to claim 10 wherein the plastic insert has clearance holes and the mounting bracket has clearance holes and wherein the mounting bracket includes threaded fasteners that pass through the clearance holes of the mounting bracket, plastic insert and mounting member and engage the threaded holes of the mounting member.

12. A mounting assembly for mounting a vehicle accessory to a sheet metal structure of a vehicle comprising the mounting member of claim 1, a visor having a mounting bracket and fasteners for fastening the bracket to the mounting member, wherein the mounting bracket has an upper surface with electrical connectors insulatedly fastened to upper surface through an insulating pad, a plastic insert having a lower surface with electrical connectors insulatedly fastened to the lower surface, wherein the plastic insert is located between the mounting member and mounting bracket, and wherein fastening the fasteners to the mounting member engages the electrical contacts of the mounting bracket with the electrical contacts of the plastic insert.

* * * * *

UNITED STATES PATENT AND TRADEMARK OFFICE
CERTIFICATE OF CORRECTION

PATENT NO. : 5,752,853
DATED : May 19, 1998
INVENTOR(S) : Edward G. Curtindale

It is certified that error appears in the above-indentified patent and that said Letters Patent is hereby corrected as shown below:

At column 5, claim 3, line 3, after "vehicle", insert --having--.

At column 5, claim 4, line 9, delete "formed".

Signed and Sealed this

Eighteenth Day of August, 1998

Attest:

BRUCE LEHMAN

Attesting Officer     Commissioner of Patents and Trademarks